US011679837B2

(12) United States Patent
Lin

(10) Patent No.: US 11,679,837 B2
(45) Date of Patent: Jun. 20, 2023

(54) MANUFACTURING METHOD OF INTEGRALLY FORMED BEARING FREE PEDAL

(71) Applicant: VP Components Co., Ltd., Taichung (TW)

(72) Inventor: Wen-Hwa Lin, Taichung (TW)

(73) Assignee: VP COMPONENTS CO., LTD., Taichung Hsien (TW)

( * ) Notice: Subject to any disclaimer, the term of this patent is extended or adjusted under 35 U.S.C. 154(b) by 200 days.

(21) Appl. No.: 17/182,718

(22) Filed: Feb. 23, 2021

(65) Prior Publication Data

US 2022/0266945 A1 Aug. 25, 2022

(51) Int. Cl.
| | | |
|---|---|---|
| B62M 3/08 | (2006.01) | |
| B29C 45/14 | (2006.01) | |
| B29C 45/16 | (2006.01) | |
| B29L 31/30 | (2006.01) | |
| B29K 23/00 | (2006.01) | |

(52) U.S. Cl.
CPC .............. *B62M 3/08* (2013.01); *B29C 45/14* (2013.01); *B29C 45/1671* (2013.01); *B29K 2023/12* (2013.01); *B29L 2031/3091* (2013.01)

(58) Field of Classification Search
CPC ...... B62M 3/08; B29C 45/14; B29C 45/1671; B29K 2023/12; B29L 2031/3091
USPC ........................................................ 74/594.4
See application file for complete search history.

(56) References Cited

U.S. PATENT DOCUMENTS

| | | | | |
|---|---|---|---|---|
| 3,313,177 A | * | 4/1967 | Mueller ................... | B62M 3/08 |
| | | | | 74/594.6 |
| 9,896,151 B1 | * | 2/2018 | Hsieh ..................... | B62M 3/086 |
| 2007/0034043 A1 | * | 2/2007 | Feltrin .................... | B62M 3/00 |
| | | | | 74/594.1 |
| 2009/0100961 A1 | * | 4/2009 | Hu .......................... | B62M 3/08 |
| | | | | 74/560 |

(Continued)

FOREIGN PATENT DOCUMENTS

| | | | | |
|---|---|---|---|---|
| CN | 107310679 A | * | 11/2017 | ............. B29C 45/14 |
| EP | 3118098 A1 | * | 1/2017 | ............. B62M 3/08 |

(Continued)

OTHER PUBLICATIONS

Translation of CN 107310679 A, Lin Wen-Hua, Nov. 3, 2017 (Year: 2017).*

(Continued)

*Primary Examiner* — Vinh Luong
(74) *Attorney, Agent, or Firm* — Muncy, Geissler, Olds & Lowe, P.C.

(57) ABSTRACT

An integrally formed bearing free pedal includes a central axle and a pedal body. The pedal body has a rotation axis, and is provided with an axle bore formed along the rotation axis. The central axle has an installation portion and an opposite combination portion. The central axle and the pedal body are integrally molded. The combination portion is disposed in the axle bore. A rotation gap is formed between the periphery of the central axle and the axle bore, so as to allow the central axle to rotate with respect to the pedal body along the rotation axis. Thus, the pedal has no bearings and other related components, so as to be structurally simple, and the manufacturing cost is reduced.

6 Claims, 6 Drawing Sheets

(56) References Cited

U.S. PATENT DOCUMENTS

| | | | |
|---|---|---|---|
| 2011/0262583 A1* | 10/2011 | Lin | B29C 45/332 |
| | | | 425/556 |
| 2016/0107347 A1* | 4/2016 | Tsai | B29C 45/2602 |
| | | | 425/129.1 |
| 2018/0111658 A1* | 4/2018 | Saccucci | G05G 1/50 |

FOREIGN PATENT DOCUMENTS

| | | | | |
|---|---|---|---|---|
| GB | 1103458 | * | 2/1968 | B62M 3/08 |
| TW | M367883 U | | 11/2009 | |

OTHER PUBLICATIONS

Wikipedia Polyoxymethylene, Oct. 14, 2022 (Year: 2022).*
What is polypropylene material, Microsoft Bing, Oct. 25, 2022 (Year: 2022).*

* cited by examiner

MANUFACTURING METHOD OF INTEGRALLY FORMED BEARING FREE PEDAL

BACKGROUND OF THE INVENTION

1. Field of the Invention

The present invention relates to pedals, and more particularly, to an integrally formed bearing free pedal and manufacturing method thereof.

2. Description of the Related Art

Referring to Taiwan patent M367883, a bicycle pedal structure is disclosed, comprising a pedal body, a bearing, an axle tube, a pedal axle, and a nut. The pedal body is engaged on the axle tube through an injection molding process, with two ends of the axle tube provided with an axle seat, on which the bearing is disposed. The pedal axle passes through the bearing to be fastened by the nut.

The aforementioned patent meets the requirement of a reduced cost and a lightened weight. However, no matter whether the pedal body is directly injection molded on the axle tube or the axle tube is placed into the pedal body after it is injection molded, the manufacturing processes are relatively complicated, and the components of bearing and nuts are necessary, therefore failing to achieve the actual lightening and time saving effects. Improvement on those issues is desirable.

SUMMARY OF THE INVENTION

To improve the issues above, an integrally formed bearing free pedal is disclosed, comprising only a pedal body and a central axle. Also, the pedal body and the central axle are integrally molded, such that the manufacturing process is simplified, and the cost of manufacturing is lowered.

For achieving the aforementioned objectives, an integrally formed bearing free pedal in accordance with an embodiment of the present invention is provided, which is formed of a pedal body and a central axle. The pedal body defines a rotation axis and comprises an axle bore arranged along the rotation axis. The axle bore opens at one end of the pedal body. The central axle comprises an installation portion and a combination portion in opposite to the installation portion. The central axle and the pedal body are integrally formed in a mold. The combination portion is disposed in the axle bore, with a rotation gap formed between a periphery of the central axle and the axle bore, such that the rotation gap allows the central axle to rotate about the rotation axis with respect to the pedal body.

In another embodiment of the present invention, a manufacturing method of an integrally formed bearing free pedal is provided, comprising following steps: providing a central axle; placing the central axle into a manufacturing mold, and injecting a chemical material on an outer side of the central axle to form a pedal body, the pedal body comprising an axle bore, wherein the pedal body inlays the central axle in the axle bore; and, during a solidifying process of the pedal body, rotating the central axle in the axle bore for preventing the chemical material from adhering to a surface of the central axle, such that a rotation gap is formed between a periphery of the central axle and the axle bore after the pedal body is solidified.

Therefore, the present invention is integrally formed of only the pedal body and the central axle, saving the process of bearing installation and simplifying the manufacturing process, achieving the advantage of lowering the manufacturing cost.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion. Embodiments of the present invention are illustrated in detail along with the drawings. However, the technical features included by the present invention are not limited to certain embodiments hereby provided. Scope of the present invention shall be referred to the claims, which include all the possible replacements, modifications, and equivalent features.

Figure 1:
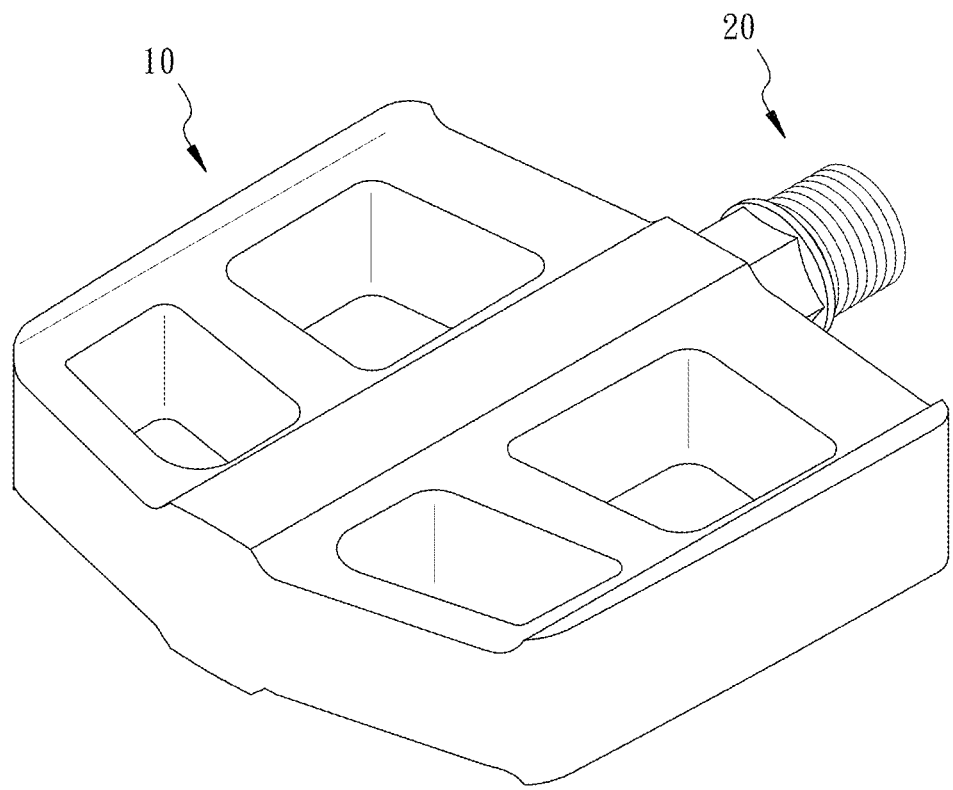
FIG. 1 is a perspective view of the bearing free pedal in accordance with an embodiment of the present invention.
Figure 2:
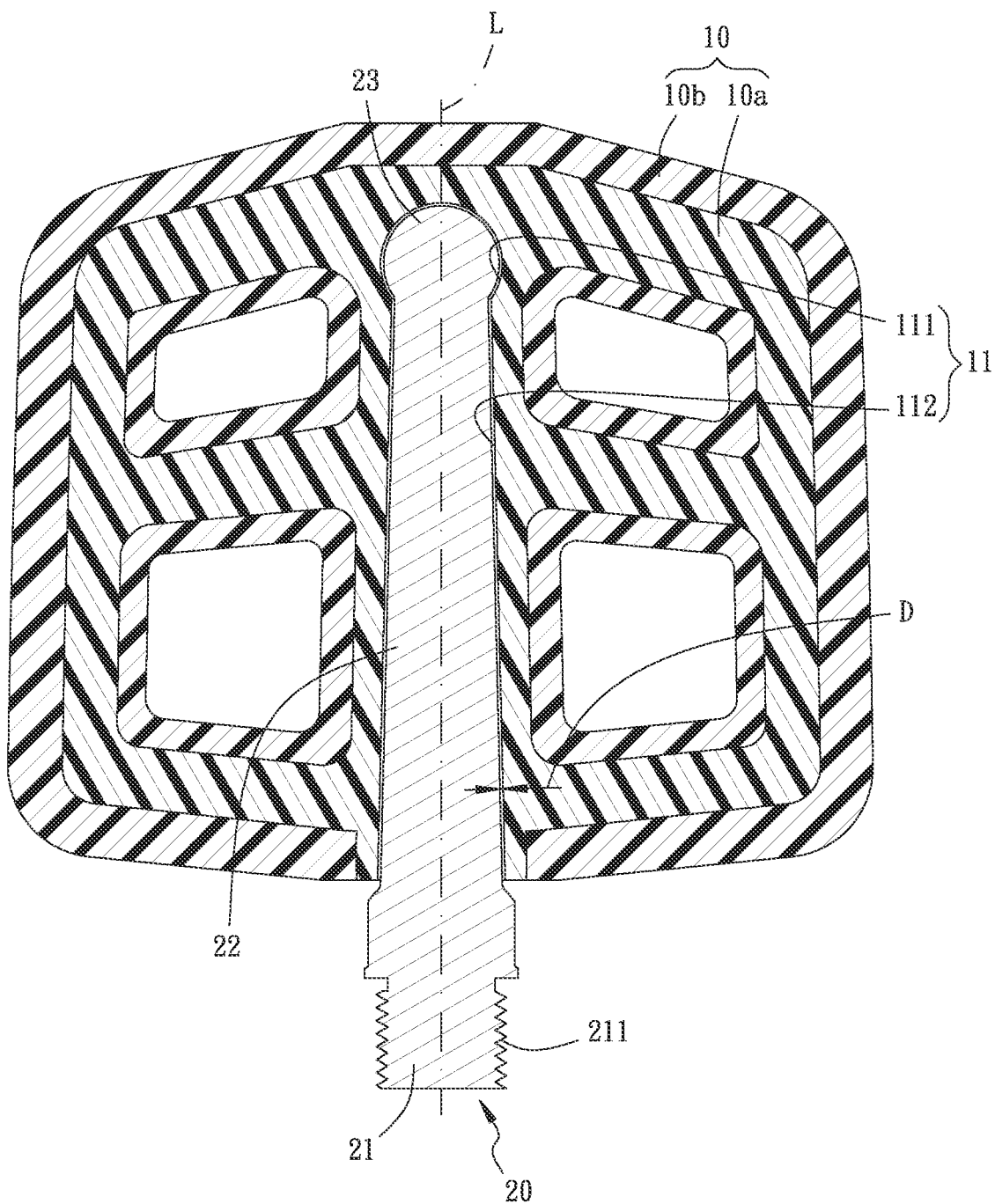
FIG. 2 is a sectional view taken through the length of the bearing free pedal in accordance with an embodiment of the present invention.
Figure 3:
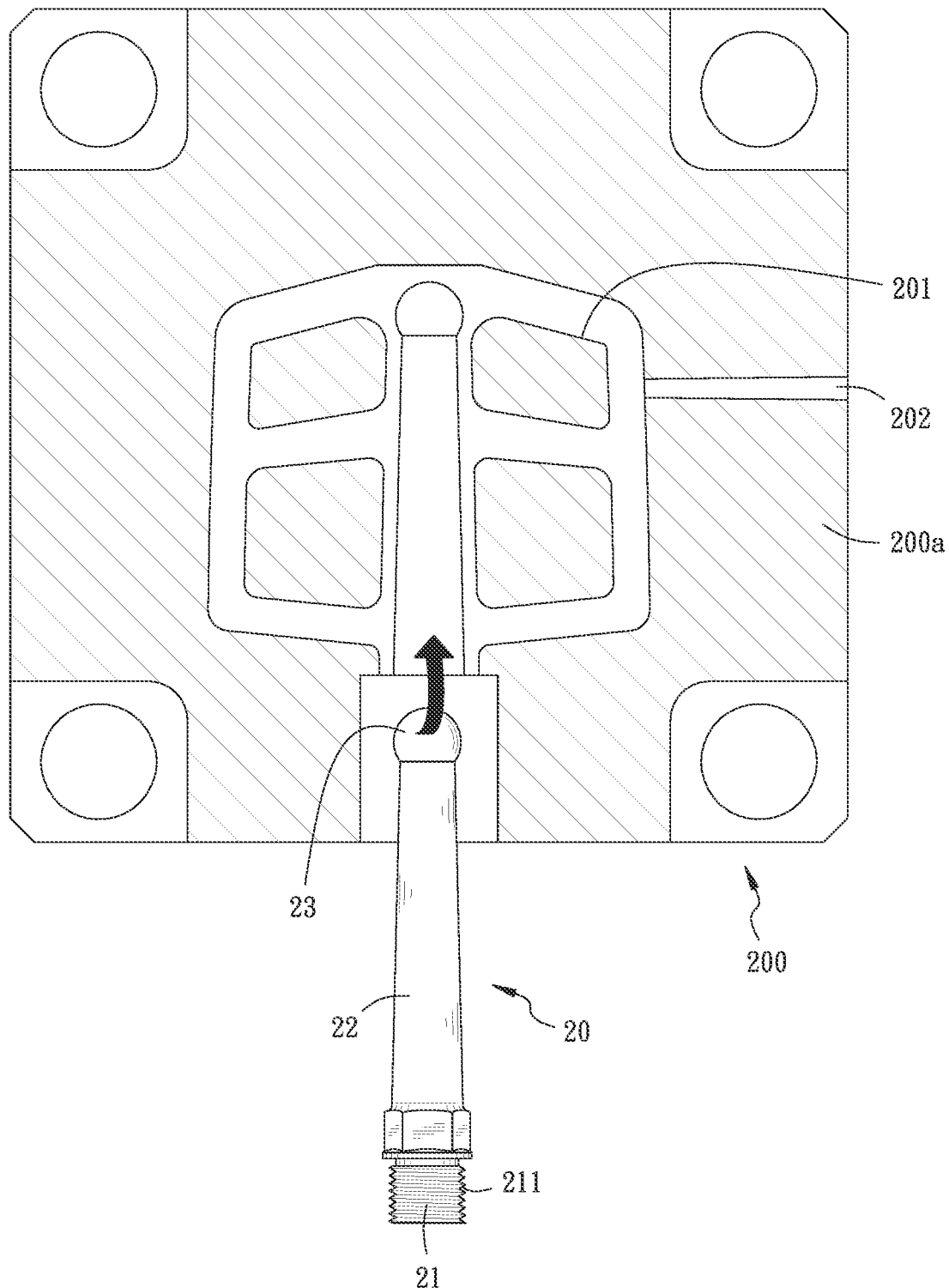
FIG. 3 is a first schematic view of the process of the manufacturing method of the bearing free pedal in accordance with an embodiment of the present invention, illustrating the central axle being placed into the first mold of the manufacturing mold.
Figure 4:
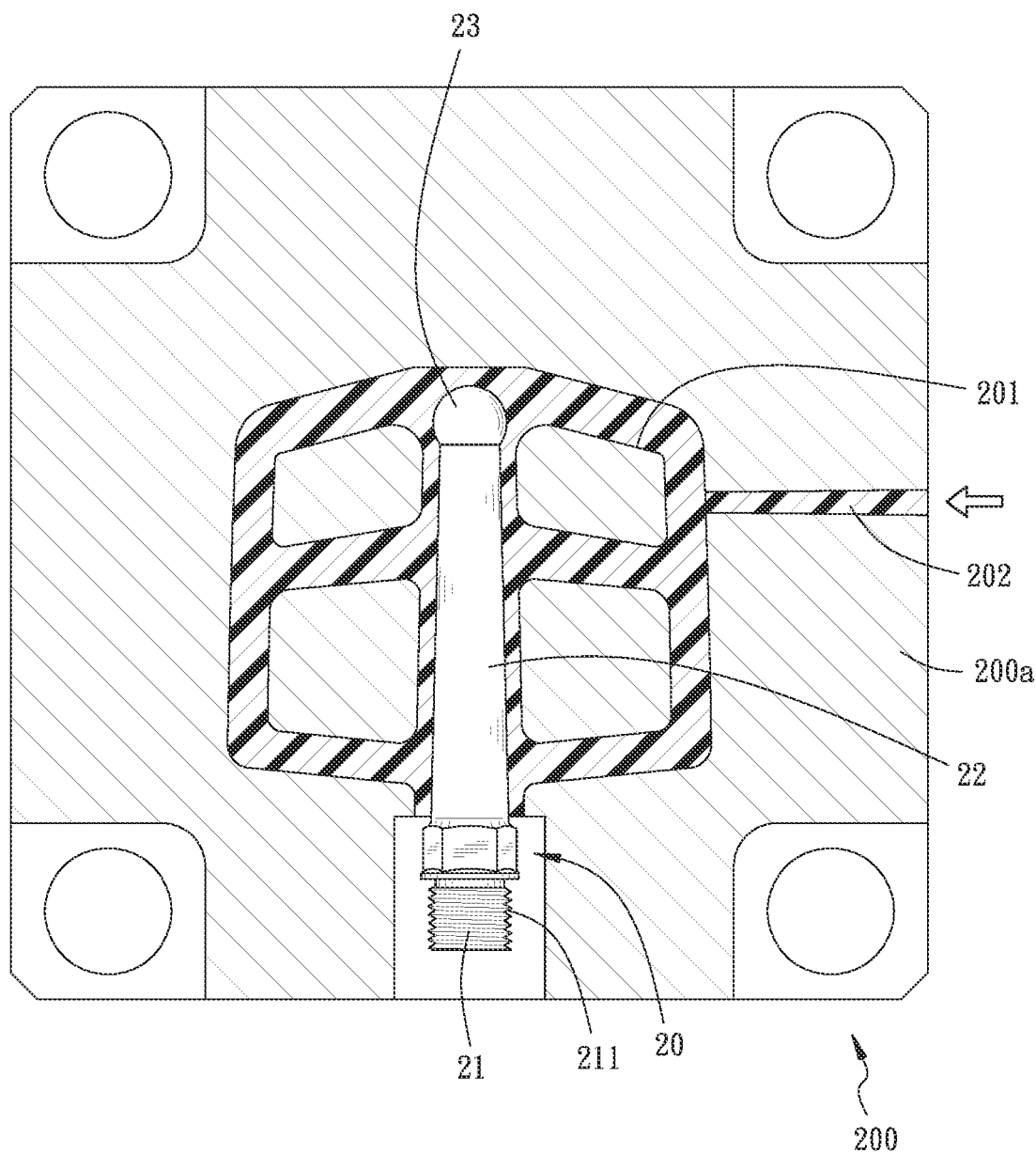
FIG. 4 is a second schematic view of process of the manufacturing method of the bearing free pedal in accordance with an embodiment of the present invention, illustrating the inner layer member of the pedal body being injected on an outer side of the central axle.
Figure 5:
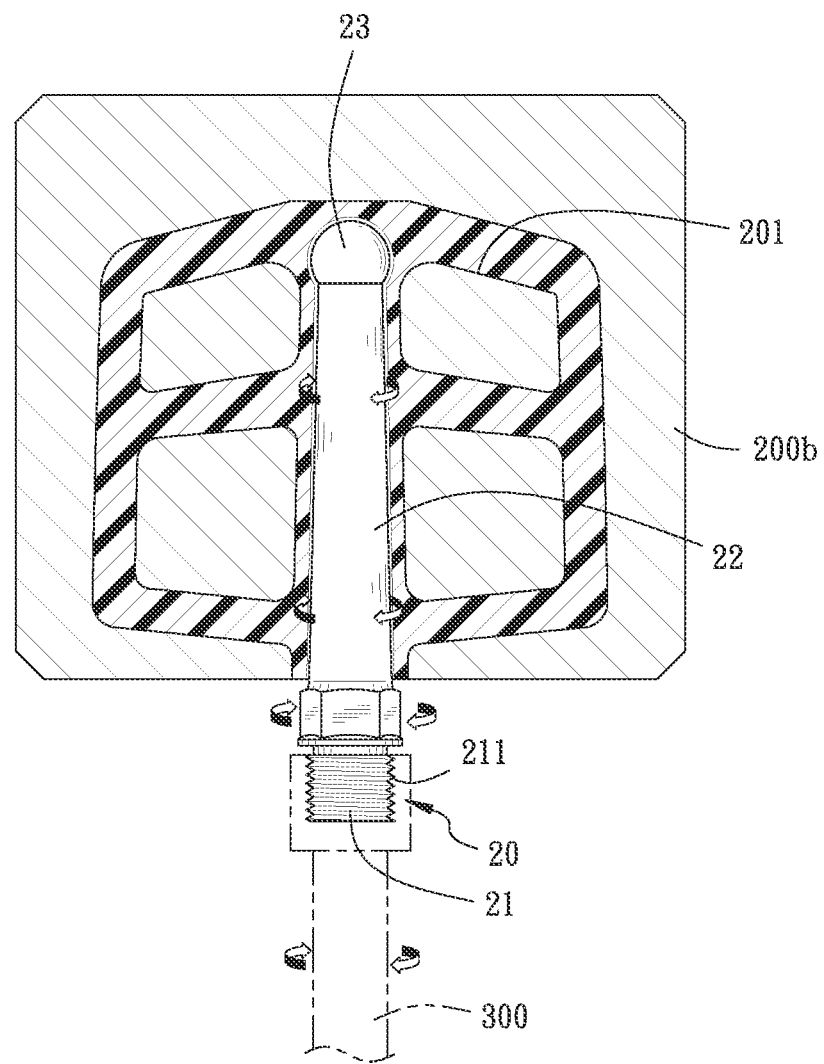
FIG. 5 is a third schematic view of the process of the manufacturing method of the bearing free pedal in accordance with an embodiment of the present invention, illustrating the semi-finished product of the central axle and the pedal body in a second mold, and the drive unit driving the central axle to rotate with respect to the pedal body.
Figure 6:
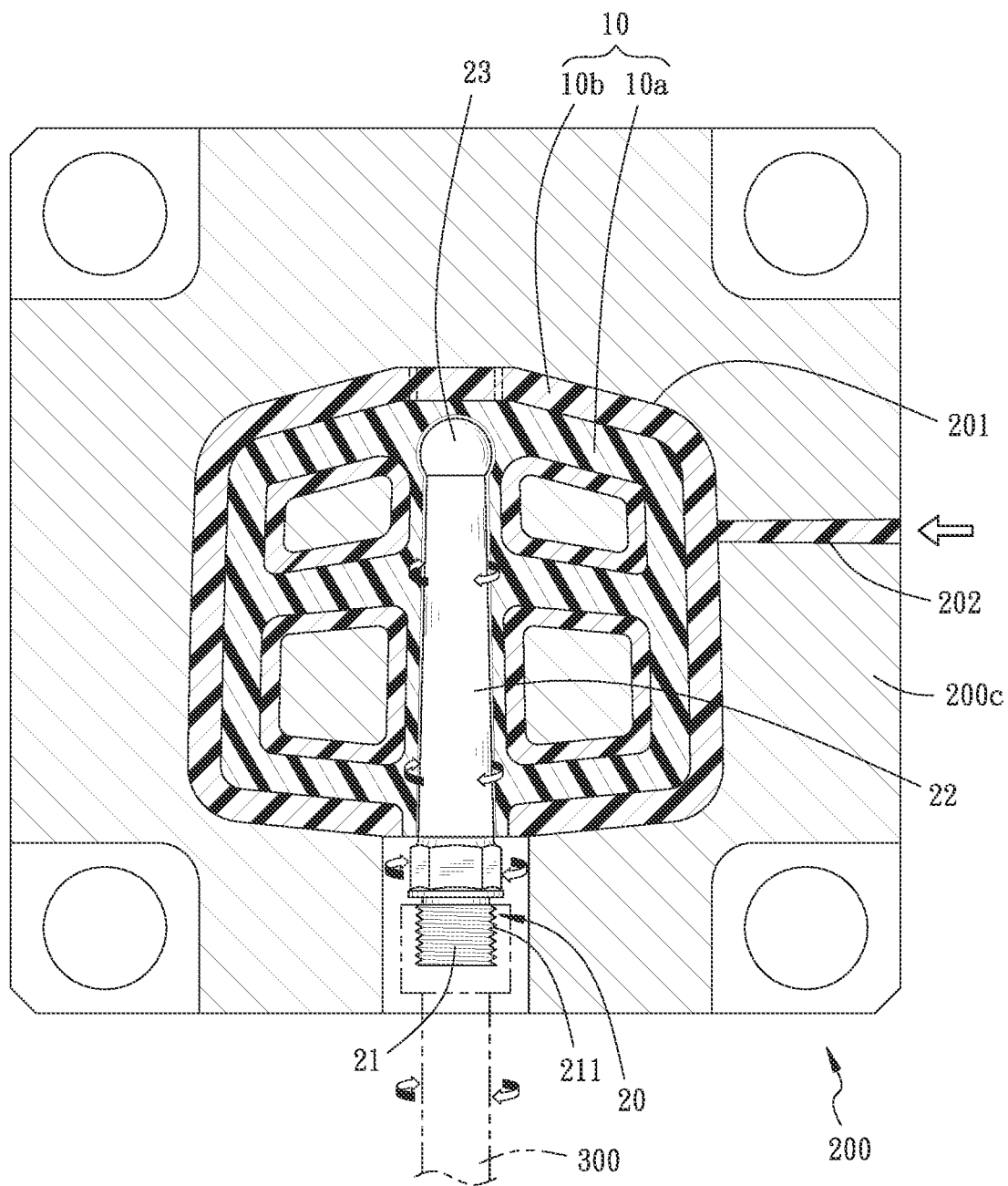
FIG. 6 is a fourth schematic view of the process of the manufacturing method of the bearing free pedal in accordance with an embodiment of the present invention, illustrating the semi-finished product of the central axle and the pedal body in a third mold, and the outer layer member being injected on an outer side of the inner layer member.

Referring to FIG. 1 to FIG. 6, the present invention provides an integrally formed bearing free pedal 100 comprising a pedal body 10 and a central axle 20, without a bearing and other relevant components. The bearing free pedal 100 is allowed to be installed on the crank of a bicycle, so that the rider imposes force with foot for pedaling the bearing free pedal 100.

The pedal body defines a rotation axis L, and comprises an axle bore 11 formed along the rotation axis L. One end of the axle bore 11 in the pedal body 10 is open, wherein the axle bore 11 comprises an inner section 111 and an outer section 112. The inner section 111 is sealed and not exposed. One part of the outer section 112 away from the inner section 111 is open.

The central axle 20 comprises an installation portion 21 and a combination portion 22 in disposed in opposite to the installation portion 21. The installation portion 21 comprises a thread 211 and allowed to be installed on the crank of the bicycle. The central axle 20 has a block portion 23 disposed on the combination portion 22. In the embodiment, the profile size of the block portion 23 is larger than the profile size of the combination portion 22. The block portion 23 is formed in a semi-sphere shape and integrally formed on a distal end of the central axle 20. Also, the combination portion 22 tapers from the installation portion 21 toward the block portion 23, such that the central axle 20 is provided with a certain degree of structural strength, and the pedal 100 of the present invention is thereby lightened at the same time.

In the embodiment, the central axle 20 and the pedal body 10 are integrally formed in the mold, such that the combination portion 22 is disposed in the axle bore 11. Therein, the pedal body 10 is injection molded with chemical material to inlay the central axle in the axle bore 11. Also, in the solidification process of the pedal body 10, the central 20 rotates about the rotation axis L in the axle bore 11 with respect to the pedal body 10, so as to form a rotation gap D between the periphery of the central axle 20 and the axle bore 11, whereby the chemical material is prevented from adhering to the surface of the central axle 20 before completely solidified. Therefore, after the molding of the pedal body 10 and the central axle 20, the rotation gap D allows the central axle 20 to freely rotate about the rotation axis L with respect to the pedal body 10.

After the pedal 100 is solidified, the profile of the combination portion 22 matches the outer section 112, and the profile of the block portion 23 matches the inner section 111, such that the central axle 20 will not be detached from the axle bore 11. In another embodiment, the shape of the block portion 23 is allowed to be other irregular shapes, as long as the shape of the block portion 23 does not affect the rotation of the central axle 20 with respect to the pedal body 10.

In another embodiment, the pedal body 10 comprises an inner layer member 10a and an outer layer member 10b. When the inner layer member 10a is integrally formed with the central axle 20, the outer layer member 10b is then injection molded on the outer side of the inner layer member 10a, wherein the inner layer member 10a is formed of a low-friction chemical material, such as polyoxymethylene (POM), and the outer layer member 10b is formed of polypropylene (PP). Also, the outer layer member 10b is allowed to be manufactured into a predetermined shape according to different demands. In other embodiments, the outer layer member 10b can be provided with non-slip protrusion points, so as to prevent the foot of the user from accidentally slipping with respect to the pedal 100.

With the foregoing configuration, the pedal body 10 and the central axle 20 are integrally formed in the mold, wherein the central axle 20 is able to freely rotate with respect to the pedal body 10, and no bearing (self-lubricating bearing) and related components are needed between the pedal body 10 and the central axle 20. In other words, only two components are needed to form the bearing free pedal 100, so that the cost time and cost of manufacturing and assembling are significantly reduced, thereby providing customers with a low cost pedal 100 product.

For realizing the aforementioned bearing free pedal 100, a manufacturing method of the bearing free pedal 100 in accordance with the present invention is provided, comprising following steps.

Provide a central axle 20. The central axle 20 is formed of an iron material and provided with a smooth surface.

Place the central axle 20 into a manufacturing mold 200, and inject a chemical material on an outer side of the central axle 20 to form a pedal body 10. The pedal body 10 comprises air axle bore 11. The shape of the axle bore 11 matches the shapes of the combination portion and the block portion 23 of the axle 20, so that the pedal body 10 inlays the central axle 20 in the axle bore 11. Therein, the pedal body 10 comprises an inner layer member 10a and an outer layer member 10b. The manufacturing mold 200 is disposed on the injection molding machine, such as a two-color injection molding machine or a three-color injection molding machine. The manufacturing mold 200 can comprise a first mold 200a, a second mold 200b, and a third mold 200c. During a solidifying process, the central axle 20 is moved to the first mold 200a, and a first injection step is carried out for injecting the chemical material of POM through the injection channel 202 into the mold cavity 201, such that the inner layer member 10a is formed on the outer side of the central axle 20.

Next, during the solidification process of the inner layer member 10a of the pedal body 10, the not yet solidified inner layer member 10a and the central axle 20 are moved into the second mold 200b and imposed with a cooling down measure, whereby the inner layer member 10a of the pedal body 10 is cooled down to a temperature between 40° C. to 60° C., such that the inner layer member 10a is in a nearly solidified status. Next, a drive unit 300, such as a motor having a force output axle, is applied for driving the central axle 20 to rotate with a predetermined rate in the axle bore 11, so as to prevent the chemical material from adhering to a surface of the central axle 20 before complete solidification. When the inner layer member 10a of the pedal body 10 is completely solidified, a rotation gap D will be formed between the periphery of the central axle 20 and the axle bore 11, wherein the rotation gap D is between 0.15 to 0.3 mm, such as 0.2 mm. Additionally, before the central axle 20 is placed into the manufacturing mold 200, a high temperature tolerant grease can be applied between the surface of the central axle 20 and the pedal body, facilitating the rotation of the central axle 20 with respect to the pedal body 10.

Then, the solidified inner layer member 10a and the central axle 20 are moved to the third mold 200c, and, in a second injection step, a PP material is injected to form the outer layer member 10b which contains the inner layer member 10a therein. In the third mold 200c, the central axle 20 rotates with respect to the axle bore 11 to the pedal body 10 until the pedal 10 is solidified and the mold is opened, thus completing the manufacturing process of the integrally formed bearing free pedal 100. Therein, the amount of molds in the present invention is only for illustration instead of limiting the present invention. Thus, in other embodiments of the present invention, the pedal body 10 is allowed to be in a single layer structure, so that the pedal 100 is manufactured with only one mold during the molding process.

In another embodiment, after the inner layer member 10a is initially molded in the first mold 200a, when the first mold 200a is slightly opened and the inner layer member 10a is ready to be moved to the second mold 200b, an air blowing measure is allowed to be applied for cooling the temperature of the inner layer member 10a. Also, the air blowing measure facilitates the formation of the interval distance between the inner layer member 10a and the axle bore 20, so as to prevent the chemical material from adhering to the central axle 20. Therein, the air blowing measure can also be applied for cooling down the pedal body 10 in the second mold 200b and the third mold 200c.

In another embodiment of the present invention, before the central axle 20 is placed into the manufacturing mold 200, an examination step can be applied for identifying if the thread of the thread 211 is structurally correct. The examination step can be achieved by cooperation of an automatic feeding machine and an examination machine. After the examination, an automatic feeding machine is able to automatically feeding the central axle 20 into the manufacturing mold 200 for injection molding, and an automatic retrieving mechanism can be applied for taking out and packaging the molded product, achieving an automatic production.

Therefore, the integrally formed bearing free pedal 100 and manufacturing method thereof have following advantages.

The bearing free pedal 100 is formed of only the pedal body 10 and the central axle 20. With a rotation gap D between the central bore 20 and axle bore 11 of the pedal body 10, the central axle 20 is allowed to freely rotate with respect to the pedal body 10, without the need of a bearing and other related lubricating components. Thus, the overall structure is simplified, and the overall weight is lightened.

The bearing free pedal 100 is formed of the pedal body 10 and the central axle 20 that are integrally molded. The manufacturing process is simple. No man power is needed for assembling complicated components. Therefore, the cost of manufacturing of the product is effectively reduced.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A manufacturing method of an integrally formed bearing free pedal, comprising following steps:

providing a central axle;

placing the central axle into a manufacturing mold, and injecting a chemical material on an outer side of the central axle to form a pedal body, the pedal body comprising an axle bore and inlaying the central axle in the axle bore, wherein the pedal body comprises an inner layer member and an outer layer member; the manufacturing mold comprises a first mold, a second mold, and a third mold; the inner layer member is formed through a first injection step on an outer side of the central axle;

during a solidifying process of the pedal body, moving the central axle and the inner layer member into the second mold, and rotating the central axle with respect to the axle bore with a drive unit for preventing the chemical material from adhering to a surface of the central axle, such that a rotation gap is formed between a periphery of the central axle and the axle bore after the inner layer member is solidified; and moving the solidified inner layer member and central axle into the third mold, and forming the outer layer member through a second injection step to inlay the inner layer member in the outer layer member.

2. The manufacturing method of claim 1, wherein the central axle comprises an installation portion and a combination portion disposed in opposite to the installation portion, and the central axle comprises a block portion disposed on the combination portion, such that the central axle is not detached from the axle bore.

3. The manufacturing method of claim 2, wherein the inner layer member is formed of an injection of polyoxymethylene; the outer layer member is formed of an injection of a PP material.

4. The manufacturing method of claim 2, wherein the central axle comprises an installation portion and a combination portion disposed in opposite to the installation portion; the installation portion is a thread; before the central axle is placed into the manufacturing mold, the central axle is examined through an examination step to identify if the thread is structurally correct.

5. The manufacturing method of claim 1, wherein, in the third mold, the drive unit is applied for driving the central axle to rotate with respect to the axle bore unit the pedal body is solidified.

6. The manufacturing method of claim 1, wherein, before the central axle rotates with respect to the axle bore, the pedal body is cooled down to a temperature between 40° C. to 60° C.; the rotation gap (D) ranges from 0.15 mm to 0.3 mm.

* * * * *